United States Patent
Schliwa-Bertling et al.

(10) Patent No.: US 10,660,150 B2
(45) Date of Patent: May 19, 2020

(54) SYSTEM AND METHOD FOR FLEXIBLE USER EQUIPMENT IDENTIFICATION

(71) Applicant: TELEFONAKTIEBOLAGET LM ERICSSON (PUBL), Stockholm (SE)

(72) Inventors: Paul Schliwa-Bertling, Ljungsbro (SE); Håkan Axelsson, Linkoping (SE); Stefan Johansson, Linkoping (SE); Thomas Walldeen, Linkoping (SE); Magnus Stattin, Upplands Vasby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/075,497

(22) PCT Filed: Feb. 3, 2017

(86) PCT No.: PCT/IB2017/050615
§ 371 (c)(1),
(2) Date: Aug. 3, 2018

(87) PCT Pub. No.: WO2017/134630
PCT Pub. Date: Aug. 10, 2017

(65) Prior Publication Data
US 2019/0045573 A1    Feb. 7, 2019

Related U.S. Application Data

(60) Provisional application No. 62/292,126, filed on Feb. 5, 2016.

(51) Int. Cl.
*H04W 76/19* (2018.01)
*H04W 76/11* (2018.01)
(Continued)

(52) U.S. Cl.
CPC ............ *H04W 76/19* (2018.02); *H04W 8/24* (2013.01); *H04W 76/11* (2018.02); *H04W 76/27* (2018.02); *H04W 88/02* (2013.01)

(58) Field of Classification Search
CPC ....... H04W 8/24; H04W 36/00; H04W 76/02; H04W 76/11; H04W 76/19; H04W 76/27;
(Continued)

(56) References Cited

U.S. PATENT DOCUMENTS 9,210,711 B2 * 12/2015 Wiberg ............... H04W 74/006
10,057,904 B2 * 8/2018 Centonza ............ H04W 72/048
(Continued)

FOREIGN PATENT DOCUMENTS

WO    WO 2008/087524 A2    7/2008

OTHER PUBLICATIONS

Kumer Swamy Pasupuleti: "How LTE Stuff Works?: RRC Connection Reestablishment Request".

*Primary Examiner* — Tri H Phan
(74) *Attorney, Agent, or Firm* — Sage Patent Group

(57) ABSTRACT

A system and method is introduced for flexible user equipment ("UE") identification. In one embodiment, the method includes providing a first message from a user equipment (110) to a radio access node (120) to resume a passive user equipment context. The message includes a UE identifier (400) having a flag (410) indicating if the user equipment (110) is resuming connectivity to the radio access node (120) and a first local UE identifier (420) for the radio access node (120).

15 Claims, 5 Drawing Sheets

(51) Int. Cl.
*H04W 76/27* (2018.01)
*H04W 8/24* (2009.01)
*H04W 88/02* (2009.01)

(58) Field of Classification Search
CPC . H04W 88/02; H04W 28/0289; H04W 40/26; H04W 40/28; H04W 40/248; H04L 29/08612; H04L 67/145
See application file for complete search history.

(56) References Cited

U.S. PATENT DOCUMENTS

| | | | |
|---|---|---|---|
| 10,321,471 B2* | 6/2019 | Johansson | H04W 28/0289 |
| 2010/0304771 A1* | 12/2010 | Dottling | H04L 5/0007 |
| | | | 455/509 |
| 2012/0243462 A1* | 9/2012 | Bucknell | H04B 7/155 |
| | | | 370/315 |
| 2013/0039339 A1 | 2/2013 | Rayavarapu et al. | |
| 2016/0255552 A1* | 9/2016 | Uchino | H04B 7/024 |
| | | | 370/329 |
| 2018/0302944 A1* | 10/2018 | Chang | H04W 76/20 |
| 2019/0029066 A1* | 1/2019 | Xu | H04W 76/19 |

\* cited by examiner

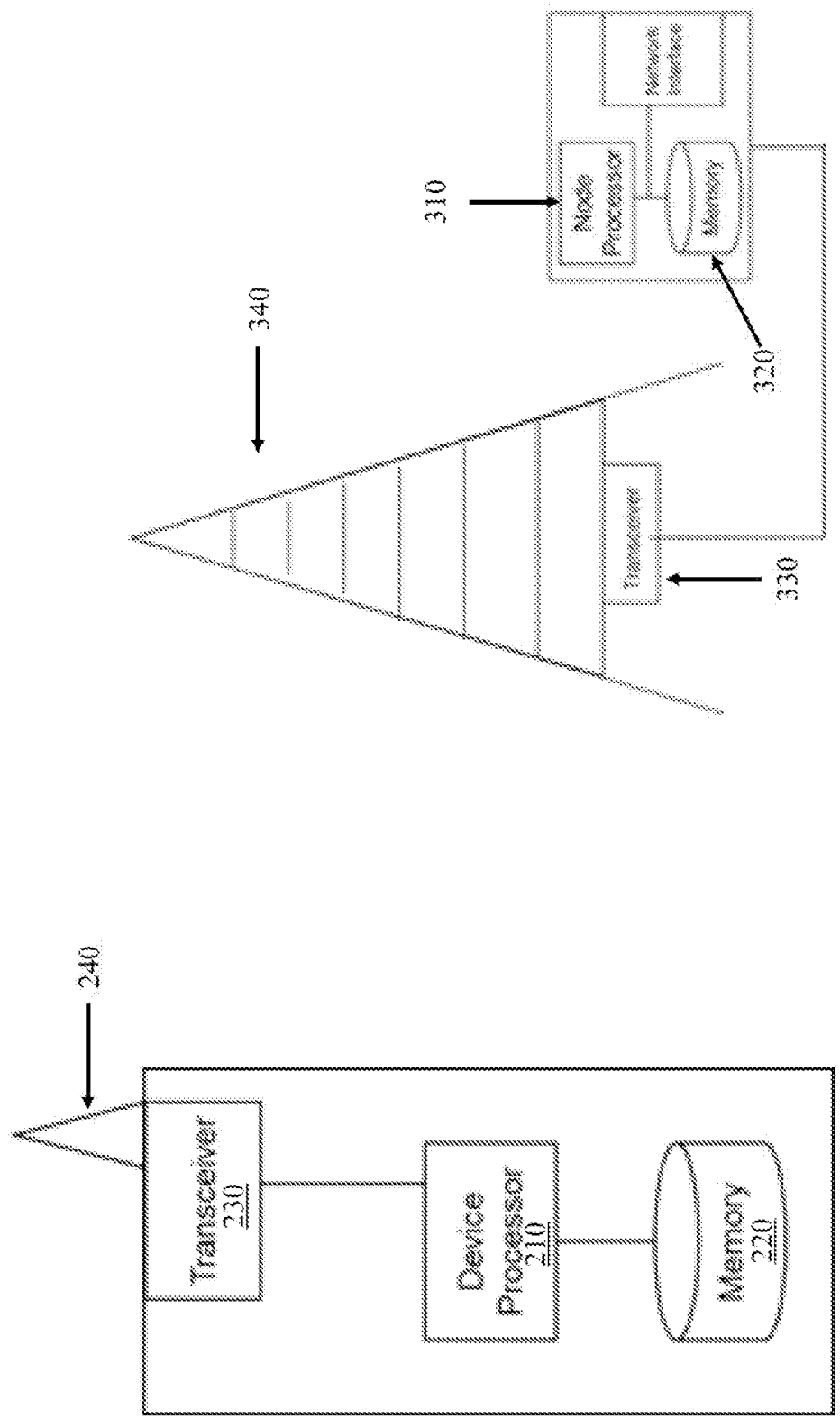

SYSTEM AND METHOD FOR FLEXIBLE USER EQUIPMENT IDENTIFICATION

PRIORITY

This application is the National Stage of International Application No. PCT/IB2017/050615, which claims the benefit of U.S. Provisional Application No. 62/292,126, filed Feb. 5, 2016, the disclosures of which are fully incorporated herein by reference.

BACKGROUND

The Third Generation Partnership Program ("3GPP"), Release ("Rel")-13 (which is incorporated herein by reference along with all other Releases set forth herein) includes features to suspend and resume radio resource control ("RRC") context. The general idea is that when a user equipment ("UE") session ends and the UE goes to an RRC idle state, both the UE and the radio access network ("RAN") keep a passive UE context. This passive UE context can be re-activated with a slim resume procedure. The use of the resume procedure leads to a fast setup of radio communication resources, which means low latency for the communication system including the UE, and efficient execution of the procedure therein.

When the UE requests re-activation (resume) of a passive UE context, the UE signals an identifier to the RAN so that RAN can find the passive UE context to re-use and re-activate this context. Since the new access can be done in another communication node (e.g., another base station) of the RAN than where the passive UE context is stored (i.e., an initial communication node or initial base station), the identifier should include an identity of the initial communication node. Consequently, the another communication node can locate the initial communication node that holds the passive UE context.

In a 3GPP Long Term Evolution ("LTE") communication system, the mechanism for establishing or re-activating a connection may be sent on a common control channel ("CCCH"). The CCCH is associated with logical channel identifier ("LCID") 0 in the media access control ("MAC") layer. In the 3GPP LTE communication system, a unique base station identifier (or in short "eNBId") within a public land mobile network ("PLMN") is built up from 20 bits.

As mentioned above, the request from the UE to re-activate the passive UE context should include a unique identifier for the initial communication node holding the passive UE context. Typically in the 3GPP LTE communication system, a UE is identified with a system architecture evolution ("SAE") temporary mobile subscriber identity ("TMSI") including 40 bits, but this does not fit the "message 3" together with the unique base station identifier (eNBId). Thus, the length of the identifier may exceed the frame size for the messaging within some communication systems.

The identifier should be large enough to cover the expected large number of passive UE contexts for a base station where the 3GPP LTE communication system is operating with the suspend and resume functionality. Therefore, support for a larger identifier would be beneficial, but still keeping in mind flexibility to enhance (or optimize) latency and performance in normal cases.

The RRC message in the 3GPP LTE communication system that may carry this information (resume id among other things) is an RRC message in the resume procedure (typically called a "message 3"). In legacy procedures, this is called an RRC connection request. The "message 3" refers to a signal in an LTE random access procedure and may contain more than just the RRC connection/connection resume request, e.g., MAC control element(s) or service data units ("SDUs") from other logical channels depending on the use case. An RRC connection request is an RRC message sent in the message 3 in the legacy LTE during attempts to establish an RRC connection. In other situations, the message 3 may include other information. The message 3 in the LTE may include 56 bits. The radio access node can choose to provide resources for a larger message 3, albeit at the expense of coverage and/or expanded delay. The message 3 can carry 72 bits in existing technologies and there are reasons to maintain the message size to allow the resume procedure to work with legacy procedures and performance. While the 72 bits can accommodate the 40 bits for the S-TMSI of the UE, it cannot incorporate the unique base station identifier, which may be on the order of 20 bits. It would be beneficial, therefore, to incorporate a flexible UE identification that, for instance, can accommodate a unique base station identifier for the resume procedure.

SUMMARY

These and other problems are generally solved or circumvented, and technical advantages are generally achieved, by advantageous embodiments of the present invention for a system and method for flexible user equipment ("UE") identification. In one embodiment, the method includes providing a first message from the user equipment to a radio access node to resume a passive user equipment context. The message includes a UE identifier having a flag indicating if the user equipment is resuming connectivity to the radio access node and a first local UE identifier for the radio access node.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 1 to 3 illustrate diagrams of embodiments of a communication system, and portions thereof;

Corresponding numerals and symbols in the different FIGUREs generally refer to corresponding parts unless otherwise indicated, and may not be redescribed in the

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for flexible user equipment identification in a communication system.

A process will be described herein with respect to exemplary embodiments in a specific context, namely, a system and method for flexible user equipment identification in a communication system. While the principles will be described in the environment of a 3GPP LTE communication system, any environment that may benefit from flexible user equipment identification is well within the broad scope of the present disclosure.

Figure 1:
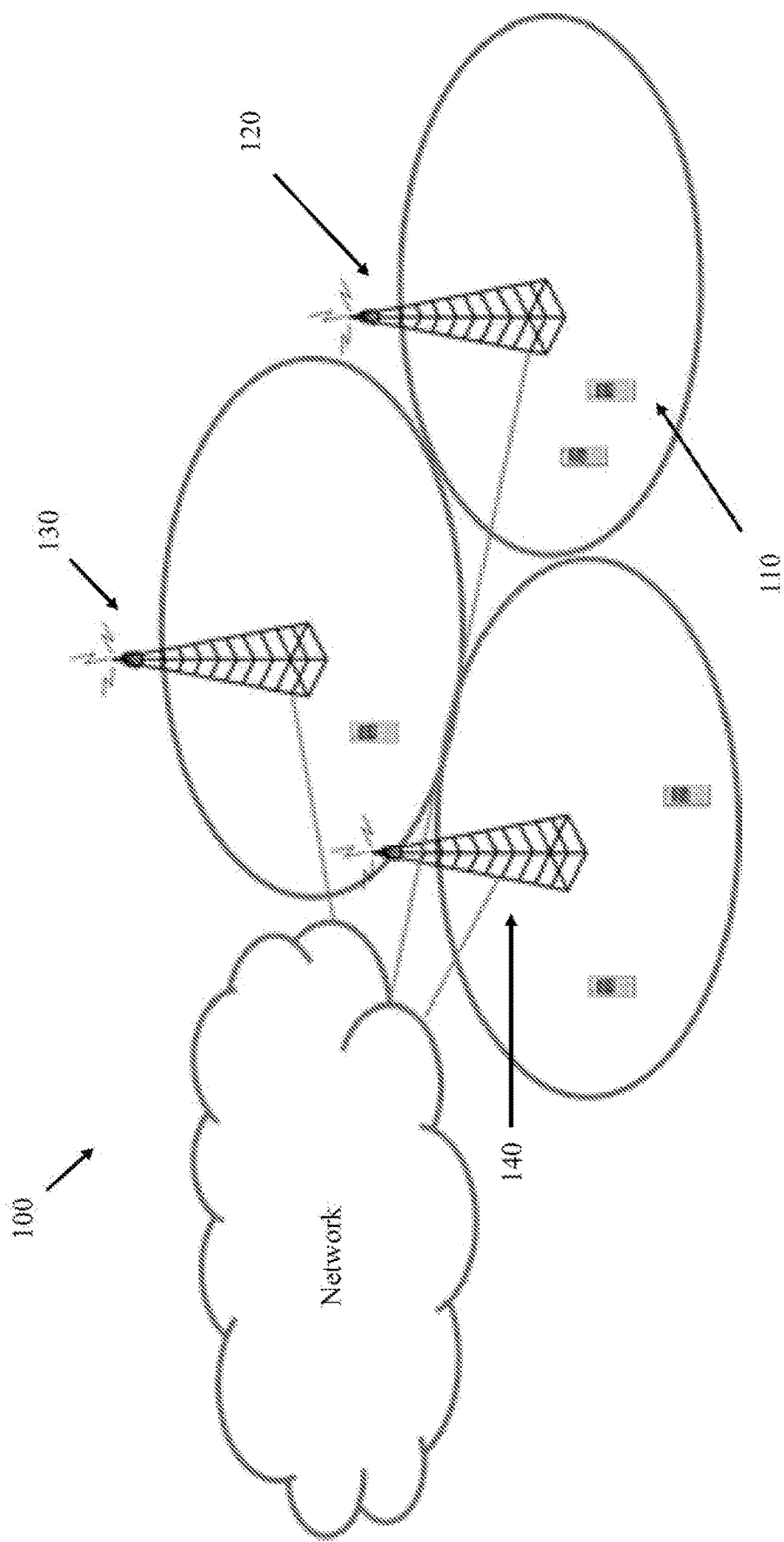

Referring initially to FIGS. 1 to 3, illustrated are diagrams of embodiments of a communication system, and portions thereof. As shown in FIG. 1, the communication system includes one or more instances of wireless communication devices (one of which is designated 110) such as conventional user equipment ("UE"), machine type communication ("MTC") and machine-to-machine ("M2M") UEs. The communication system also includes one or more radio access nodes 120, 130, 140 such as eNodeBs or other base stations capable of communicating with the wireless communication devices 110 along with any additional elements suitable to support communication between wireless communication devices 110 or between a wireless communication device 110 and another communication device (such as a landline telephone). Although the illustrated wireless communication devices 110 may represent communication devices that include any suitable combination of hardware and/or software, the wireless communication devices 110 may, in particular embodiments, represent devices such as the example wireless communication device illustrated in greater detail by FIG. 2. Similarly, although the illustrated radio access nodes 120, 130, 140 may represent network nodes that include any suitable combination of hardware and/or software, these nodes may, in particular embodiments, represent devices such as the example radio access node illustrated in greater detail by FIG. 3.

As shown in FIG. 2, the example wireless communication device includes a processor 210, a memory 220, a transceiver 230, and an antenna 240. In particular embodiments, some or all of the functionality described above as being provided by UEs, MTC or M2M devices, and/or any other types of wireless communication devices may be provided by the device processor executing instructions stored on a computer-readable medium, such as the memory shown in FIG. 2. Alternative embodiments of the wireless communication device may include additional components beyond those shown in FIG. 2 that may be responsible for providing certain aspects of the device's functionality, including any of the functionality described above and/or any functionality necessary to support the solution described herein.

As shown in FIG. 3, the example radio access node includes a processor 310, a memory 320, a transceiver 330, and an antenna 340. In particular embodiments, some or all of the functionality described herein may be provided by a base station, a node B, an enhanced node B, a base station controller, a radio network controller, a relay station and/or any other type of network node may be provided by the node processor executing instructions stored on a computer-readable medium, such as the memory shown in FIG. 3. Alternative embodiments of the radio access node may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device.

The system and methods described herein enable flexible UE identification that is applicable to technologies for resuming a passive UE context which is currently in standardization in 3GPP, Rel-13. The UE identification solution can be of flexible size (e.g., between 40 and x bits) including a global base station identifier, a flag indicating whether the base station identifier is included in the flexible UE identifier, and a local UE identifier (an identifier for the UE that is unique for a base station). The local UE identifier can be of flexible size and can be allocated by a procedure deciding the size and value of the flexible UE identifier. While the system and methods will be described in accordance with the 3GPP, Rel-13, the principles are equally applicable to future releases and other radio access technologies.

A method for signaling the flexible UE identifier to the RAN includes different signaling procedures depending on two parameters, namely, a size of the allocated flexible UE allocation, and whether the resume procedure is done in the same base station (an initial base station) as where the passive UE context is stored. According to the method, a first part of the flexible UE identifier is signaled in the first RRC message (a message 3), and the remainder of the flexible UE identifier (when applicable) is signaled in a second RRC message (e.g., a message 3.5) to the RAN. The message 3.5 is used when another base station is executing a resume procedure. In such cases, the message 3.5 to the another base station includes the base station identifier of the initial base station where the passive UE context is stored. The procedure allocating the flexible UE identifier may depend on an expected mobility behavior of the UE. For mobile UEs (UEs that expect to change base stations while the passive UE context is maintained in the RAN), the procedure may first select flexible UE identifiers with a size less than or equal to, without limitation, 19 bits.

The system and method as described herein allows for a very large number of passive UE contexts to be cached in the RAN and still be uniquely identified with a UE identifier with flexible size. In many cases, the size of the UE identifier can be set so that only one RRC message, with the default size, is necessary to signal the flexible UE identifier to the RAN. The flexible size of UE identifier can be used for finding passive UE contexts cached in a base station in the communication system. Legacy link performance for connection establishment can be kept for normal cases, by limiting the size of message 3 to a default size.

Figure 4:
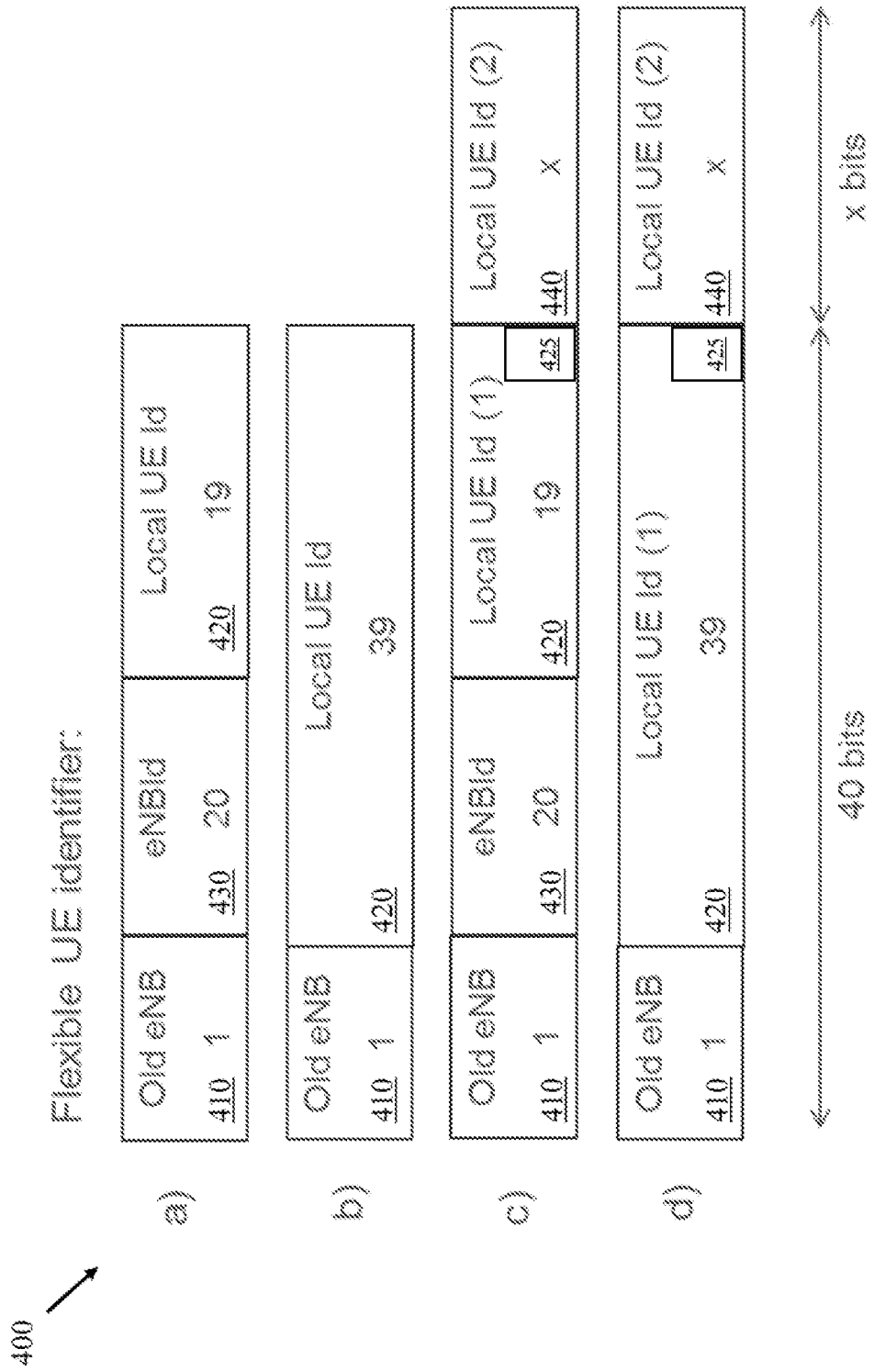
FIG. 4 illustrates block diagrams of embodiments of flexible UE identifiers.

Turning now to FIG. 4, illustrated are block diagrams of embodiments of flexible UE identifiers (generally designed 400). When signaled to the RAN, the UE may signal the flexible UE identifier 400 as one of the cases shown in FIG. 4. A first factor is to determine whether the signaling is done in the same base station as where the flexible UE identifier 400 is allocated initially (i.e., where the passive UE context is located). The UE can determine this by comparing the base station identifier ("eNBId") from an E-UTRAN cell global identifier ("E-CGI") of the current cell with the base station identifier 430 included in the flexible UE identifier 400 that the UE has been allocated. A flag 410 in the flexible UE identifier ("Old eNB") indicates whether identifier is constructed with or without the base station identifier 430. When signaling is done in the same base station, case b) or d) of FIG. 4 applies. If the UE is connected to the same base station where the passive UE context is located, then the UE identifier 400 does not need the base station identifier ("eNBId") and flag (410) is not set. If the UE is connected to a different base station than where the passive UE context is located, then the UE identifier 400 will include the base station identifier ("eNBId", again where the passive UE context is located) and the flag (410) is set.

Another factor is an allocated size of the local UE identifier ("id") 420. When size of local UE id 420 makes the total size of message 3 exceed the default size, then alternative c) or d) applies, else, case a) or b) applies. The default size of the message 3 implies that the total size of the base station identifier 430 (if applicable) plus local UE Id 420 is 40 bits.

In an Abstract Syntax Notation One ("ASN.1"), which is a standard and notation that describes rules and structures for representing, encoding, transmitting, and decoding data in telecommunications and computer networking, the flag in the flexible UE identifier can correspond to CHOICE bit(s)/index (1 bit in case of a two-way CHOICE). As a non-limiting example:

```
UE-Identifier:: = CHOICE {
                                    ueid-with-eNBID    UEID-with-eNBID,
                                    ueid-without-      UEID-without-eNBID
                                    eNBID
}
UEID-with-eNBID:: = SEQUENCE {
                                    eNBID              BIT  STRING  (SIZE
                                                       (20)),
                                    localUEID          BIT STRING (SIZE (19))
}
UEID-without-eNBID:: = SEQUENCE {
                                    localUEID          BIT STRING (SIZE (39))
}
```

The compiled output of which would correspond to options a) and b) of FIG. 4, respectively. The "CHOICE" contributes one bit to the compiled output corresponding to the "Old eNB" flag in FIG. 4.

The size of message 3 is whatever is granted by the RAN. Of course, the size of the message may be granted by different communication entities and/or mechanisms in other radio access technologies. The size of the RRC message depends on whether the initial RRC message (to be sent in message 3) comprises the whole UE identifier or only a first part of it, the second part being included in an additional RRC message (in a message 3.5). In case the initial RRC message comprises the whole UE identifier and the size of the initial RRC message exceeds the size granted for message 3, the RRC message can be segmented, the first segment to be sent in message 3 and the second in message 3.5.

When the total size of message 3 exceeds the default size (case c) and d) in FIG. 4) there are two options how to perform the signaling to the RAN. The system may use a larger size of message 3 than the default size, or signal the flexible UE identifier 400 in two steps to the RAN. The system is typically the RAN that controls the size of message 3 and the UE that signals the identifier to the RAN/radio access node, i.e., different entities for the different options.

The first alternative is straightforward in that the message size is increased beyond the default size (72 bits); however, there are drawbacks. A drawback is that a larger sized message may provide poor link performance leading to block error rate and delays. In addition, since the RAN does not know the size of the message 3 when scheduling the transmissions with the UE (giving scheduling grant to UE), the RAN has to plan for a larger sized message. This means that radio communication resources are wasted in a normal case when the shorter flexible UE identifier 400 is used, which could have been content with a 72 bit grant.

The second alternative means that the first part of the flexible UE identifier 400 (eNBId (if applicable) and "Old eNB flag" 410 and "Local UE Id (1)" 420, see FIG. 4) is signaled as part of message 3 to the RAN. The remainder of the flexible UE identifier 400 ("Local UE Id (2)" 440 see FIG. 4) is signaled in a subsequent message (e.g., the "message 3.5") to conclude the full signaling of the flexible UE identifier 400. An identification flag 425 in the first Local UE Id (1) 420 may include an indication that the flexible UE identifier 400 includes the second Local UE Id (2)" 440. The second alternative is illustrated in FIGS. 5 and 6.

Figure 5:
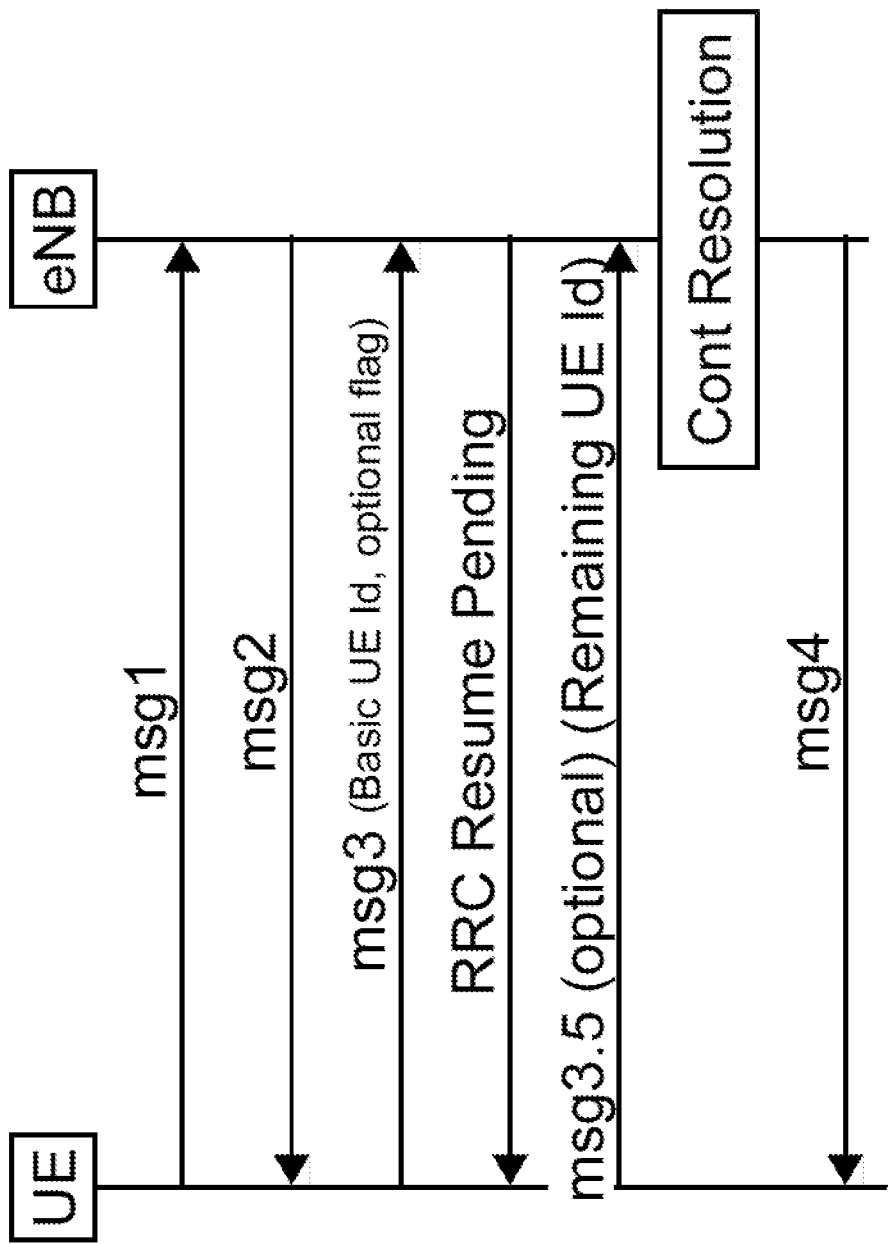
FIGS. 5 and 6 illustrate signaling diagrams of embodiments of a method of operating a communication system.
Figure 6:
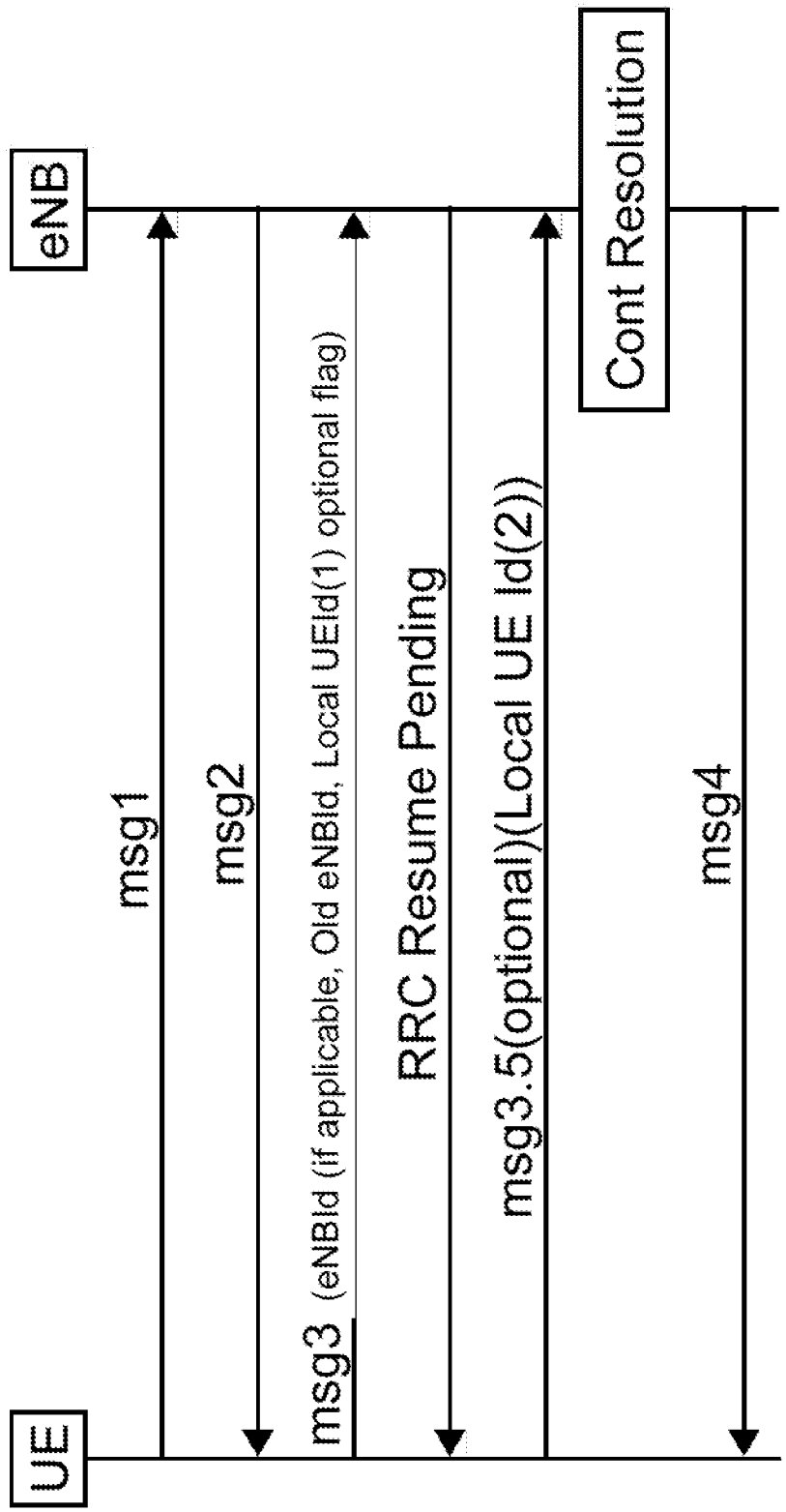

Turning now to FIGS. 5 and 6, illustrated are signaling diagrams of embodiments of a method of operating a communication system. As demonstrated in FIGS. 5 and 6, the message 3.5 ("msg3.5") can carry the remainder of the flexible UE identifier when needed. It is beneficial to limit the number of messages to resume a connection, hence the msg3.5 is an optional message.

The procedure allocating the flexible UE identifier to the UE can allocate a UE identifier with less than or equal to 40 bits for UEs considered stationary, and a UE identifier with larger than 40 bits to UEs that are considered being mobile and likely to change base stations from time to time. In this way, the procedure can augment usage of the flexible UE identifier and send the msg3.5, when necessary. Thus, the msg3.5 can be used for a UE that typically moves from base station to base station between access attempts. The procedure can allocate the flexible UE identifiers with size greater than 40 bits, when necessary. It should be noted that the flexible UE identifiers with size less than or equal to 40 bits are already allocated (i.e., identifiers up to a margin are allocated).

The need for sending msg3.5 can be indicated with a flag in the message 3. The flag can be a separate bit or, if the size of the message cannot be extended due to a limitation in the lower layers (e.g., transport block size restriction), a bit of the flexible UE identifier (e.g., one bit of the Local UE Id). Also, this "bit" is possible to (alternatively) encode/specify in ASN.1 with a CHOICE; e.g., a choice between "full" or "partial" UE Id. Alternatively, a separate logical channel identifier ("LCID") can be used to distinguish the need for sending the msg3.5 from the case when the msg3.5 is not needed. For example, LCID=0 could be used for CCCH when the flexible UE identifier can be sent in the message 3, and LCID=21 (or some other value) could be used when msg3.5 is needed to complete the signaling of the flexible UE identifier. Yet an alternative is to use a new LCID (possibly associated with a new logical channel, e.g., CCCH2) for the connection resume request message instead of extending existing message structure(s) and/or message(s) in higher layers (e.g., RRC). This can free one (or more) bits in the higher layer (e.g., RRC) message(s) and enable the introduction of the flag as a separate bit in the message. Freed bit(s) can alternatively be used for other purposes; e.g., to enable future extensions. While the above referenced embodiment was described with respect to a common control channel, the principles are equally applicable to other communication channels including a dedicated control channel ("DCCH").

Thus, a user equipment (110) operable in a communication system (100) has been introduced herein. The user equipment (110) includes a processor (210) and a memory (220) having computer program code, wherein the processor (210), the memory (220), and the computer program code are collectively operable to provide a first message (e.g., a first RRC connection request message (msg3.0), see FIGS. 5 and 6) to a radio access node (120) to resume a passive user equipment ("UE") context. The message (410) includes a UE identifier (400) having a flag (410) indicating if the user equipment (110) is resuming connectivity to the radio access node (120) and a first local UE identifier (420) for the radio access node (120). The first local UE identifier (420) is a flexible size. The UE identifier (400) may include a radio access node identifier (430) as indicated by the flag (410).

The processor (210), the memory (220), and the computer program code of the user equipment (110) are further operable to provide a second message (e.g., a second RRC connection request message (msg3.5), see FIGS. 5 and 6). While the second message is illustrated in FIGS. 5 and 6 as a msg3.5, it should be understood that the second message may not be a complete RRC connection request message, but a supplementary message or second segment of the first message as the application dictates. The second message includes a second local UE identifier (440) as part of the UE identifier (400). The UE identifier (400) may include a radio access node identifier (430) as part of the first message. In accordance with the second message, the first local UE identifier (420) may include an identification flag (425) indicating that the UE identifier (400) includes the second local UE identifier (440). Alternatively, the first message may include an indication (via, for instance, an indication flag in a header, see discussion above regarding the LCID) that the UE identifier (400) includes the second local UE identifier (440).

Thus, a radio access node (120) operable in a communication system (100) has been introduced herein. The radio access node (120) includes a processor (310) and a memory (320) including computer program code, wherein the processor (310), the memory (320), and the computer program code are collectively operable to receive a first message (e.g., a first RRC connection request message (msg3.0), see FIGS. 5 and 6) from a user equipment (110) to resume a passive user equipment (UE) context. The message (410) includes a UE identifier (400) having a flag (410) indicating if the user equipment (110) is resuming connectivity to the radio access node (120) and a first local UE identifier (420) for the radio access node (120). The first local UE identifier (420) is a flexible size. The UE identifier (400) may include a radio access node identifier (430) as indicated by the flag (410).

The processor (310), the memory (320), and the computer program code of the user equipment (110) are further operable to receive a second message (e.g., a second RRC connection request message (msg3.5), see FIGS. 5 and 6). While the second message is illustrated in FIGS. 5 and 6 as a msg3.5, it should be understood that the second message may not be a complete RRC connection request message, but a supplementary message or second segment of the first message as the application dictates. The second message includes a second local UE identifier (440) as part of the UE identifier (400). The UE identifier (400) may include a radio access node identifier (430) as part of the first message. In accordance with the second message, the first local UE identifier (420) may include an identification flag (425) indicating that the UE identifier (400) includes the second local UE identifier (440). Alternatively, the first message may include an indication (via, for instance, an indication flag in a header, see discussion above regarding the LCID) that the UE identifier (400) includes the second local UE identifier (440).

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A user equipment in a communication system, comprising:
   processing circuitry configured to:
   provide a first message to a radio access node to resume a passive user equipment context, said first message comprising a UE identifier having:
   a flag indicating if said user equipment is resuming connectivity to said radio access node, wherein said flag indicates whether said UE identifier includes a radio access node identifier, and
   a first local UE identifier for said radio access node, wherein said first local UE identifier has a flexible size.

2. The user equipment as recited in claim 1 wherein said first message comprises a first part of the UE identifier, wherein said processing circuitry is further configured to provide a second message,
   wherein said second message comprises a remaining part of the UE identifier in a second local UE identifier.

3. The user equipment as recited in claim 2 wherein said first local UE identifier includes an identification flag indicating that said UE identifier includes said second local UE identifier.

4. The user equipment as recited in claim 2 wherein said first message includes an indication that said UE identifier includes said second local UE identifier.

5. The user equipment as recited in claim 2 wherein said first message is a first radio resource control connection request message (msg3.0) and said second message is a second RRC connection request message (msg3.5).

6. A method of operating a user equipment in a communication system, comprising:
   providing a first message to a radio access node to resume a passive user equipment (UE) context, said first message comprising a UE identifier having:
   a flag indicating if said user equipment is resuming connectivity to said radio access node, wherein said flag indicates whether said UE identifier includes a radio access node identifier, and
   a first local UE identifier for said radio access node, wherein said first local UE identifier has a flexible size.

7. The method as recited in claim 6 wherein said first message comprises a first part of the UE identifier, and further comprising
   providing a second message,
   wherein said second message comprises a remaining part of the UE identifier in a second local UE.

8. The method as recited in claim 7 wherein said first local UE identifier includes an identification flag indicating that said UE identifier includes said second local UE identifier.

9. The method as recited in claim 7 wherein said first message includes an indication that said UE identifier includes said second local UE identifier.

10. The method as recited in claim 7 wherein said first message is a first radio resource control (RRC) connection request message (msg3.0) and said second message is a second RRC connection request message (msg3.5).

11. A radio access node in a communication system, comprising:
    processing circuitry configured to:
    receive a first message from a user equipment to resume a passive user equipment (UE) context, said first message comprising a UE identifier having:
    a flag indicating if said user equipment is resuming connectivity to said radio access node, wherein said flag indicates whether said UE identifier includes a radio access node identifier, and
    a first local UE identifier for said radio access node, wherein said first local UE identifier has a flexible size.

12. The radio access node as recited in claim 11 wherein said first message comprises a first part of the UE identifier, wherein said processing circuitry is further configured to receive a second message,
    wherein said second message comprises a remaining part of the UE identifier in a second local UE identifier.

13. The radio access node as recited in claim 12 wherein said first local UE identifier includes an identification flag indicating that said UE identifier includes said second local UE identifier.

14. The radio access node as recited in claim 12 wherein said first message includes an indication that said UE identifier includes said second local UE identifier.

15. The radio access node as recited in claim 12 wherein said first message is a first radio resource control (RRC)

connection request message (msg3.0) and said second message is a second RRC connection request message (msg3.5).

* * * * *